(12) United States Patent
Hochrein et al.

(10) Patent No.: US 10,005,488 B2
(45) Date of Patent: Jun. 26, 2018

(54) ELECTRICALLY CONTROLLED STEERING ASSISTANCE ACTUATOR

(71) Applicant: Ford Global Technologies, LLC, Dearborn, MI (US)

(72) Inventors: Bradley G. Hochrein, Dexter, MI (US); Jack E. Barry, Dearborn, MI (US); James Philip Cooper, Milford, MI (US); Alex Parker, Novi, MI (US); Joseph Washnock, Canton, MI (US); Salvador Toledo, Ypsilanti, MI (US); Timothy Patrick Diez, Dearborn Heights, MI (US); Thomas Philip Flanagan, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 84 days.

(21) Appl. No.: 15/145,054

(22) Filed: May 3, 2016

(65) Prior Publication Data

US 2017/0174252 A1 Jun. 22, 2017

Related U.S. Application Data

(60) Provisional application No. 62/269,220, filed on Dec. 18, 2015.

(51) Int. Cl.
*B62D 5/04* (2006.01)
*B62D 1/20* (2006.01)
(Continued)

(52) U.S. Cl.
CPC ............ *B62D 5/0412* (2013.01); *B62D 1/20* (2013.01); *B62D 3/14* (2013.01); *B62D 5/0403* (2013.01);
(Continued)

(58) Field of Classification Search
CPC ....... B62D 5/0412; B62D 5/0403; B62D 5/30
(Continued)

(56) References Cited

U.S. PATENT DOCUMENTS 6,102,151 A 8/2000 Shimizu et al.
6,973,989 B2 12/2005 Williams
(Continued)

FOREIGN PATENT DOCUMENTS

JP 2006264622 A 10/2006
JP 2007326499 A 12/2007
(Continued)

*Primary Examiner* — Tony H Winner
(74) *Attorney, Agent, or Firm* — Frank A. MacKenzie; Bejin Bieneman PLC

(57) ABSTRACT

A steering assistance actuator for a vehicle includes a actuator shaft, a torque sensor, a motor, a drive mechanism and a drive housing. The actuator shaft is rotatable about a first axis. The actuator shaft includes an integral torque sensor. The motor has an output shaft rotatable about a second axis. The second axis is substantially parallel to the first axis. The drive mechanism is disposed between and drivingly connects the motor and the steering column. The drive mechanism provides a speed reduction from the motor to the actuator shaft. The drive housing encloses the torque sensor and the drive mechanism and is separate from a steering gear. The drive housing also has a mounting feature to which a housing of the motor is fixed. The drive housing also has a first bearing and a second bearing rotatably supporting the actuator shaft in the drive housing.

4 Claims, 5 Drawing Sheets

(51) Int. Cl.
   *B62D 3/14*      (2006.01)
   *B62D 5/20*      (2006.01)
   *B62D 25/08*     (2006.01)
   *B62D 6/10*      (2006.01)

(52) U.S. Cl.
   CPC ......... *B62D 5/0424* (2013.01); *B62D 5/0481* (2013.01); *B62D 5/20* (2013.01); *B62D 6/10* (2013.01); *B62D 25/082* (2013.01)

(58) Field of Classification Search
   USPC ........................................ 280/444, 446, 407
   See application file for complete search history.

(56) References Cited

U.S. PATENT DOCUMENTS

| | | | |
|---|---|---|---|
| 7,155,905 B2 | 1/2007 | Kurata et al. | |
| 7,306,072 B2 * | 12/2007 | Bohm | B62D 5/0472 |
| | | | 180/422 |
| 7,484,588 B2 | 2/2009 | Szabela et al. | |
| 7,530,422 B2 * | 5/2009 | Bolourchi | B62D 5/0472 |
| | | | 180/406 |
| 7,735,595 B2 | 6/2010 | Kogel et al. | |
| 7,854,292 B2 | 12/2010 | Eisenbarth | |
| 8,738,231 B2 | 5/2014 | Svensson et al. | |
| 9,022,167 B2 * | 5/2015 | Park | B62D 5/065 |
| | | | 180/405 |
| 2004/0221668 A1 * | 11/2004 | Saruwatari | B62D 5/0412 |
| | | | 74/388 PS |
| 2007/0272471 A1 * | 11/2007 | Kuroumaru | B62D 5/0412 |
| | | | 180/444 |
| 2008/0264713 A1 * | 10/2008 | Deshmukh | B62D 5/0406 |
| | | | 180/446 |
| 2009/0152036 A1 * | 6/2009 | Okada | B62D 55/07 |
| | | | 180/190 |
| 2010/0295423 A1 * | 11/2010 | Hsiao | H02K 7/1016 |
| | | | 310/75 R |
| 2012/0101687 A1 | 4/2012 | Svensson et al. | |

FOREIGN PATENT DOCUMENTS

| | | |
|---|---|---|
| WO | WO 2013119147 A | 8/2013 |
| WO | WO 2014098655 A1 | 6/2014 |

\* cited by examiner

ELECTRICALLY CONTROLLED STEERING ASSISTANCE ACTUATOR

BACKGROUND

Autonomous vehicles and vehicles having driver assistance features, such as lane tracking and self-parking, require steering systems responsive to controller commands. Conventional hydraulic steering does not enable the implementation of driver assistance features and autonomous steering. One approach to addressing this concern is to equip vehicles for which such features are desired with electric-only power steering assist, relying exclusively on electric motors to provide the necessary steering input. However, completely electrical steering systems require more power than can practically be provided with 12 volt direct current ("12 V") electrical architecture common to most vehicles. In particular, a 12 V motor is unable to provide sufficient steering assist for large passenger vehicles and commercial vehicles. Not having an electrically controlled steering system is an impediment to providing autonomous large passenger vehicles and commercial vehicles.

DETAILED DESCRIPTION

A hydraulic power steering system can be supplemented with an electrical assist actuator that is able to provide the control needed to operate an autonomous vehicle. The electrical assist actuator can also be configured to reduce driver steering effort. However, the incorporation of an electrical steering assistance actuator using available hardware is challenging to implement given packaging limitations under the hood of modern vehicles and the functional constraints of available existing hardware. An exemplary electric steering assistance actuator includes an electric motor, an electronic control unit ("ECU"), a torque sensor and a reduction drive mechanism to achieve a desired torque on a steering column shaft axis. The motor, torque sensor and reduction drive mechanism are enclosed by a housing, in an exemplary embodiment formed with a plurality of connecting machined castings. Mounting of the steering assistance actuator, either with intermediate bracketry or with direct mounting to the frame or body, depends on available package space and vehicle configuration. An exemplary bracket is illustrated in the figures.

Relative orientations and directions (by way of example, upper, lower, bottom, rearward, front, rear, back, outboard, inboard, inward, outward, let, right) are set forth in this description not as limitations, but for the convenience of the reader in picturing at least one embodiment of the structures described.

Figure 1:
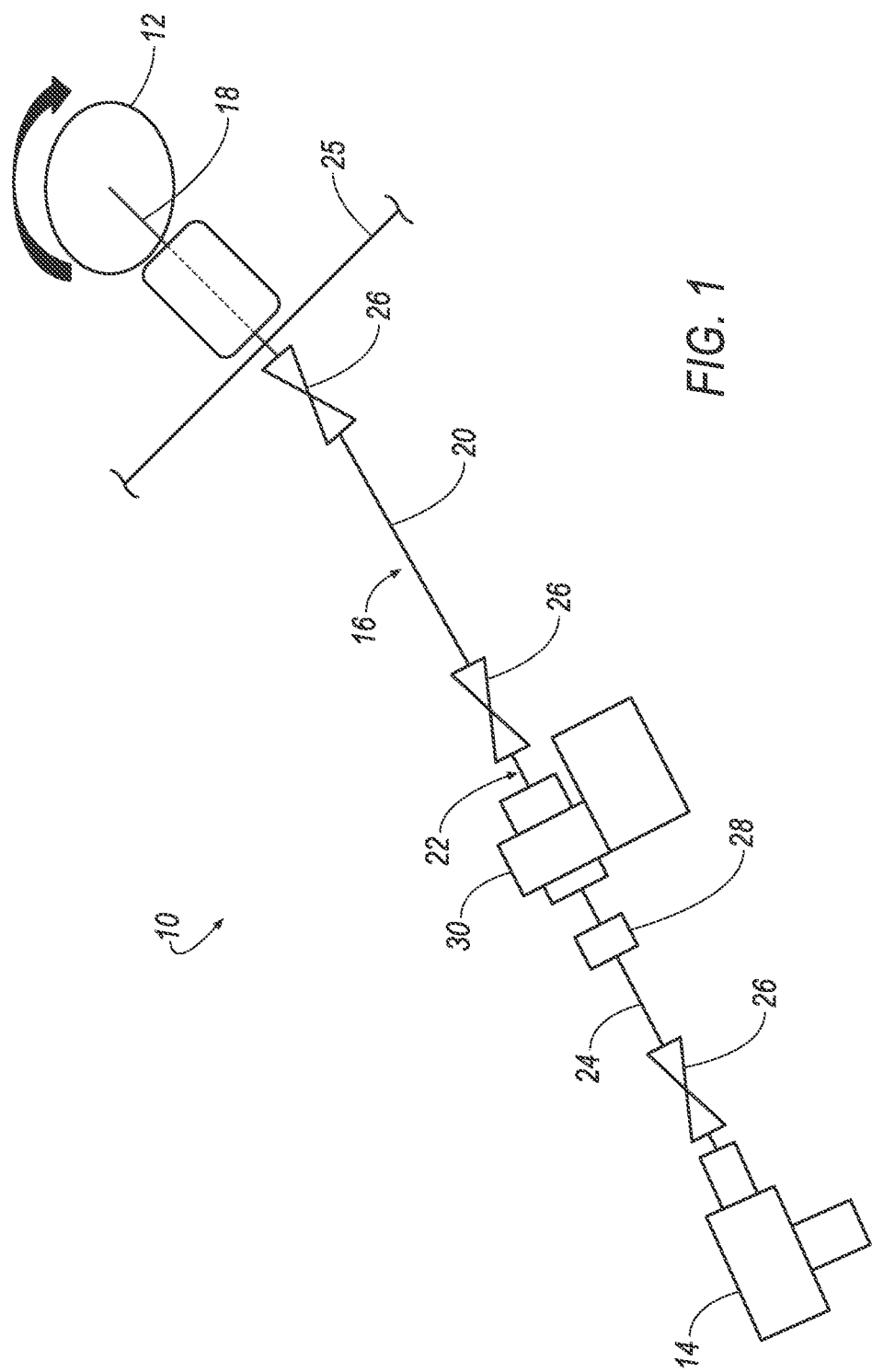
FIG. 1 is a schematic view of an exemplary vehicle steering system.

FIG. 1 illustrates a schematic diagram of an exemplary vehicle steering system 10. Vehicle steering system 10 includes a steering wheel 12, a hydraulically boosted steering gear 14, a pitman arm (not shown) disposed on an output shaft of steering gear 14 for connecting to a vehicle steering linkage (not shown), and a steering column assembly 16 disposed between steering wheel 12 and steering gear 14. Progressing from steering wheel 12 to steering gear 14, exemplary steering column assembly 16 includes an upper shaft 18, an upper intermediate shaft 20, a lower intermediate shaft 22 and a lower shaft 24. Upper shaft 18 passes through a firewall 25 that separates an engine bay from a passenger cabin with the steering wheel 12 being disposed in the passenger cabin and the steering gear 14 in the engine bay. A cardan-type universal joint 26 connects upper shaft 18 to upper intermediate shaft 20, upper intermediate shaft 20 to lower intermediate shaft 22 and lower shaft 24 to an input shaft of steering gear 14. A sliding splined coupling joint 28 slidably connects lower intermediate shaft 22 and lower shaft 24. The slidable connection accommodates axial displacement of lower shaft 24 due to the axial displacement induced by cardan joint 26. A sliding spline feature incorporated into upper intermediate shaft 20 similarly accommodates axial displacements induced by cardan joints 26 at the ends of shaft 20.

Figure 2:
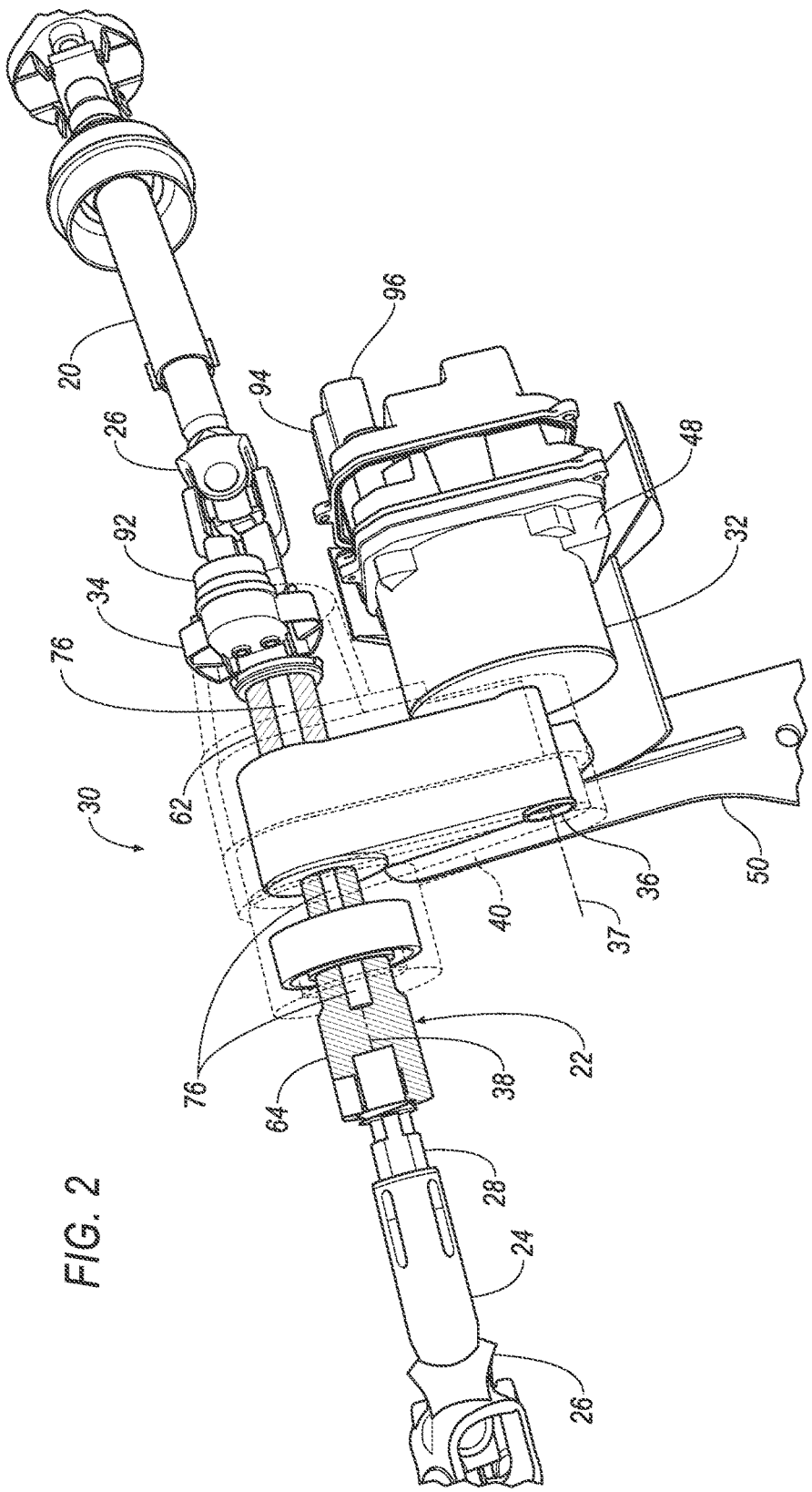
FIG. 2 is a perspective view of an exemplary electric steering assistance actuator of the steering system of FIG. 1.
Figure 3:
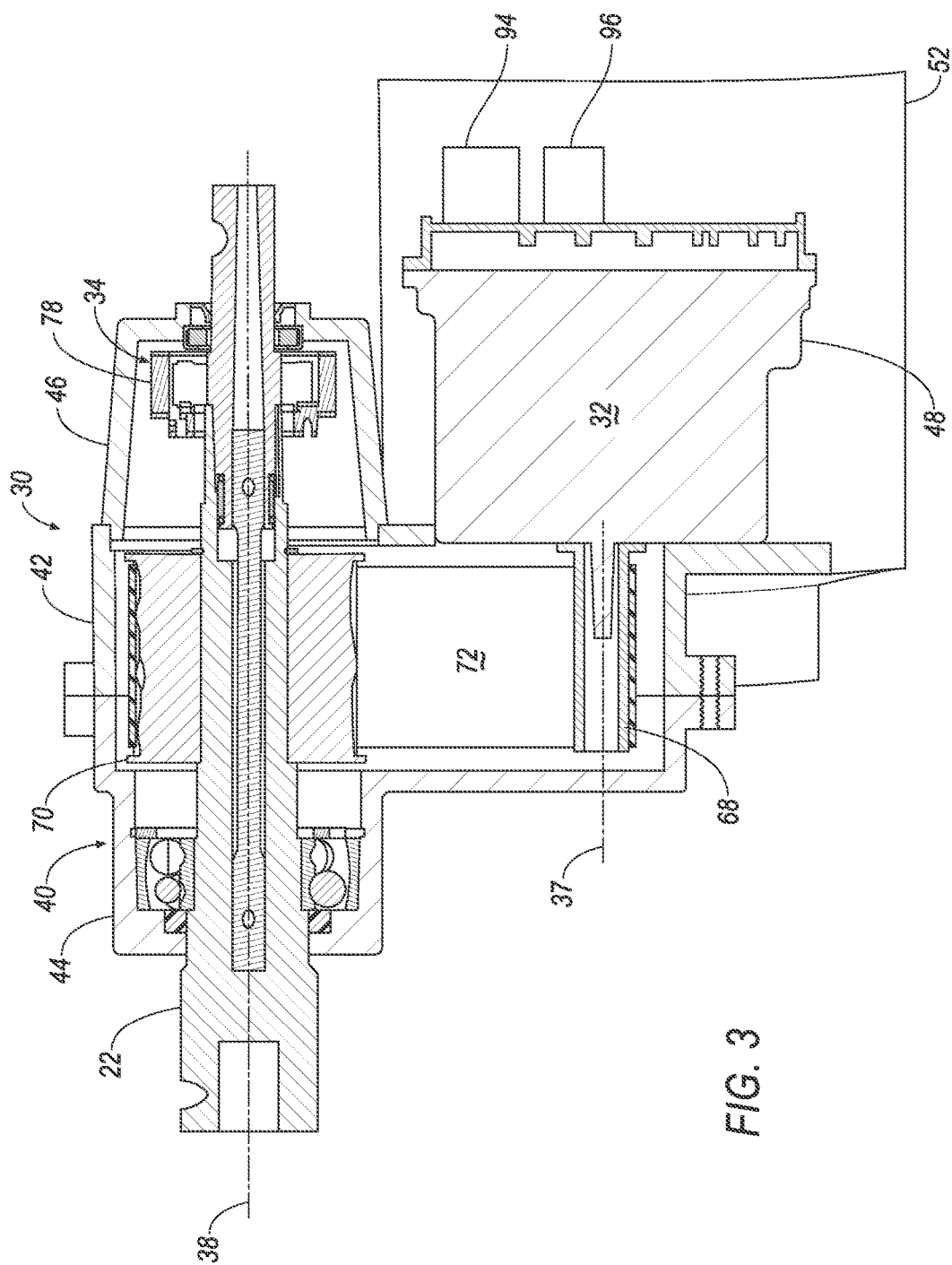
FIG. 3 is a sectional side view of the electric steering assistance actuator of FIG. 2.

An exemplary electric steering assistance actuator 30 is illustrated in FIG. 1 as being incorporated into lower intermediate shaft 22, alternatively characterized as an actuator shaft. Electric steering assistance actuator 30, shown in more detail in FIG. 2, includes an electric motor 32, an electronic control unit ("ECU") (not shown), a torque sensor 34 and a reduction drive mechanism 36 to achieve a desired torque on a steering column shaft axis. Motor 32 defines a motor axis of rotation 37 on which a motor shaft is centered and about which the motor shaft rotates. In the exemplary embodiment, the relevant steering column shaft axis is an axis 38 of lower intermediate shaft 22. Motor 32, torque sensor 34 and reduction drive mechanism 36 are enclosed by a drive housing 40, in an exemplary embodiment formed of a plurality of connecting machined castings. As shown in FIG. 3, housing 40 includes an upper portion 42 and a lower portion 44. Each of upper portion 42 and lower portion 44 are concave, and when joined have a clamshell relation, cooperatively enclosing drive mechanism 36. A housing nose 46 encloses torque sensor 34. A motor housing 48 of motor 32 supports and protects the moving parts of motor 32. In-vehicle mounting of steering assistance actuator 30 is achieved with either intermediate bracketry or with direct mounting to the frame or body, depending on available package space and vehicle configuration. An exemplary bracket 50 is illustrated in the figures. An exemplary heat shield 52 is incorporated into actuator 30 to protect it from engine heat. In the illustrated embodiment, heat shield 52 is disposed between an engine exhaust manifold and actuator 30, wrapping around motor 32, torque sensor 34 and drive mechanism 36.

Exemplary electric steering assistance actuator 30 including housing 40 is separated from steering gear 14 by lower shaft 24, and from firewall 25 by upper intermediate shaft 20. There is no need to fix actuator 30 to either firewall 25 or steering gear 14 for support, as actuator 30 is sufficiently supported by exemplary bracket 50.

Exemplary housing 40 includes aligned clamping flanges, or alternatively clamping bosses, on both upper housing portion 42 and lower housing portion 44. The flanges receive threaded fasteners which clamp portions 42 and 44 together. Housing nose 46 is fixed to upper housing portion 42, but could alternatively be formed with upper housing portion 42 as an integral piece. Lower housing portion 44 retains a lower support bearing 54 and a lower seal 56, disposed outboard of bearing 54. Housing nose 46 retains an upper support bearing 58 and an upper seal 60. Motor housing 48 and upper housing portion 42 have complementary alignment features facilitating the mounting of motor 32 to drive housing 40 in a predetermined orientation. Motor housing 48 and upper housing portion 42 are clamped to each other by threaded fasteners or rivets or an equivalent thereof. In the clamped condition, motor housing 48 and housing 40 cooperatively provide substantially parallel alignment of motor axis 37 with steering column shaft axis 38.

Lower intermediate shaft 22 comprises a steering assistance actuator input shaft 62 and a steering assistance actuator output shaft 64. A lower end of output shaft 64 comprises part of coupling 28. An upper end of input shaft 62 drivingly connects to the cardan joint 26 disposed between shaft 22 and shaft 20. An exemplary rotatable connection between shaft 62 and joint 26 is provided by a key disposed in a notch in shaft 62 received by a groove in a sleeve portion of joint 26. A lower end of input shaft 62 is rotatably disposed in an upper end of output shaft 64, with a needle roller bearing assembly 66 disposed therebetween. Relative rotation between shafts 62 and 64 is limited to a predetermined angular rotation by a feature such as a spline disposed therebetween. Output shaft 64 is supported by bearing 54. Input shaft 62 is supported by bearing 58. Seals 56 and 60 keep contaminants from entering housing 40.

Exemplary drive mechanism 36 includes a drive pulley 68 fixed to an output shaft of motor 32, a driven pulley 70 fixed to output shaft 64 and a belt 72 drivingly coupling pulleys 68 and 70. Pulley 68 has a smaller diameter than pulley 70 to provide a reduction of rotary speed and an increase in torque from motor 32 relative to shaft 22. Alternatively, an intermediate shaft may be disposed between the motor output shaft and pulley 68 to accommodate a belt width greater than an exposed length of the motor output shaft. Also alternatively, belt 72 may have teeth formed therein for receipt by complementary teeth on pulleys 68 and 70.

Figure 4:
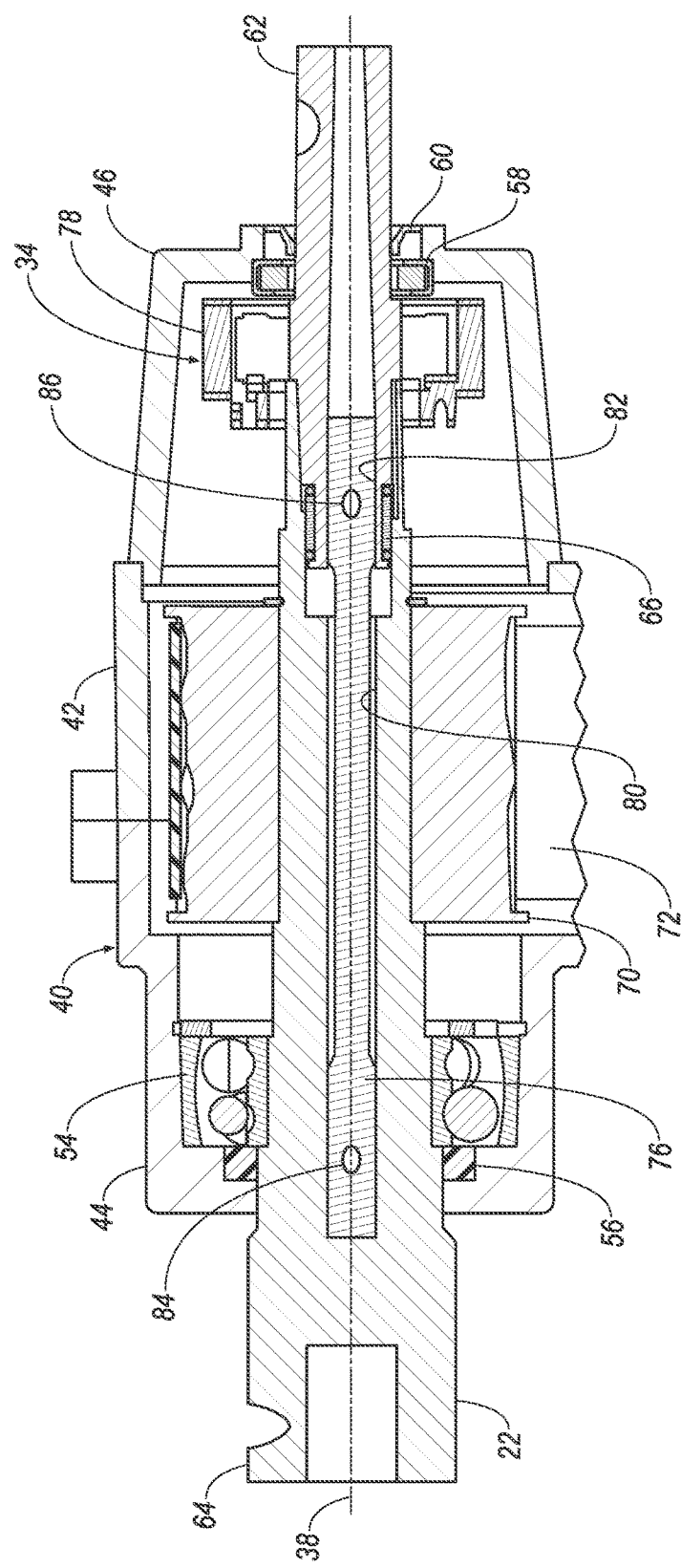
FIG. 4 is a sectional side view of a torque sensor of the electric steering assistance actuator of FIG. 3.

As best seen in FIG. 4, torque sensor 34 is formed as an integral part of lower intermediate shaft 22. Torque sensor 34 includes a torsion shaft 76 disposed between input shaft 62 and output shaft 64, and a rotational displacement sensor 78 fixed to input shaft 62 proximate to output shaft 64 to sense relative rotation therebetween. A stepped bore 80 in output shaft 64 has a first larger diameter portion receiving the lower end of input shaft 62 and bearing 66 therein. A second smaller diameter portion of bore 80 receives a first end of torsion shaft 76. Similarly, a bore 82 in input shaft 62 receives a second end of torsion shaft 76. An exemplary means of rotatively fixing the first end of torsion shaft 76 to output shaft 64 is with a pin 84 passing through both parts. Likewise, an exemplary attachment between torsion shaft 76 and input shaft 62 is with a pin 86 passing through both. The precise means of providing such a connection is not critical to the present disclosure. Alternative means of providing such a connection include press fits and welding. One alternative construction of lower intermediate shaft 22 is a one-piece shaft including an integral torque sensor in the form of a strain gauge on the shaft.

Figure 5:
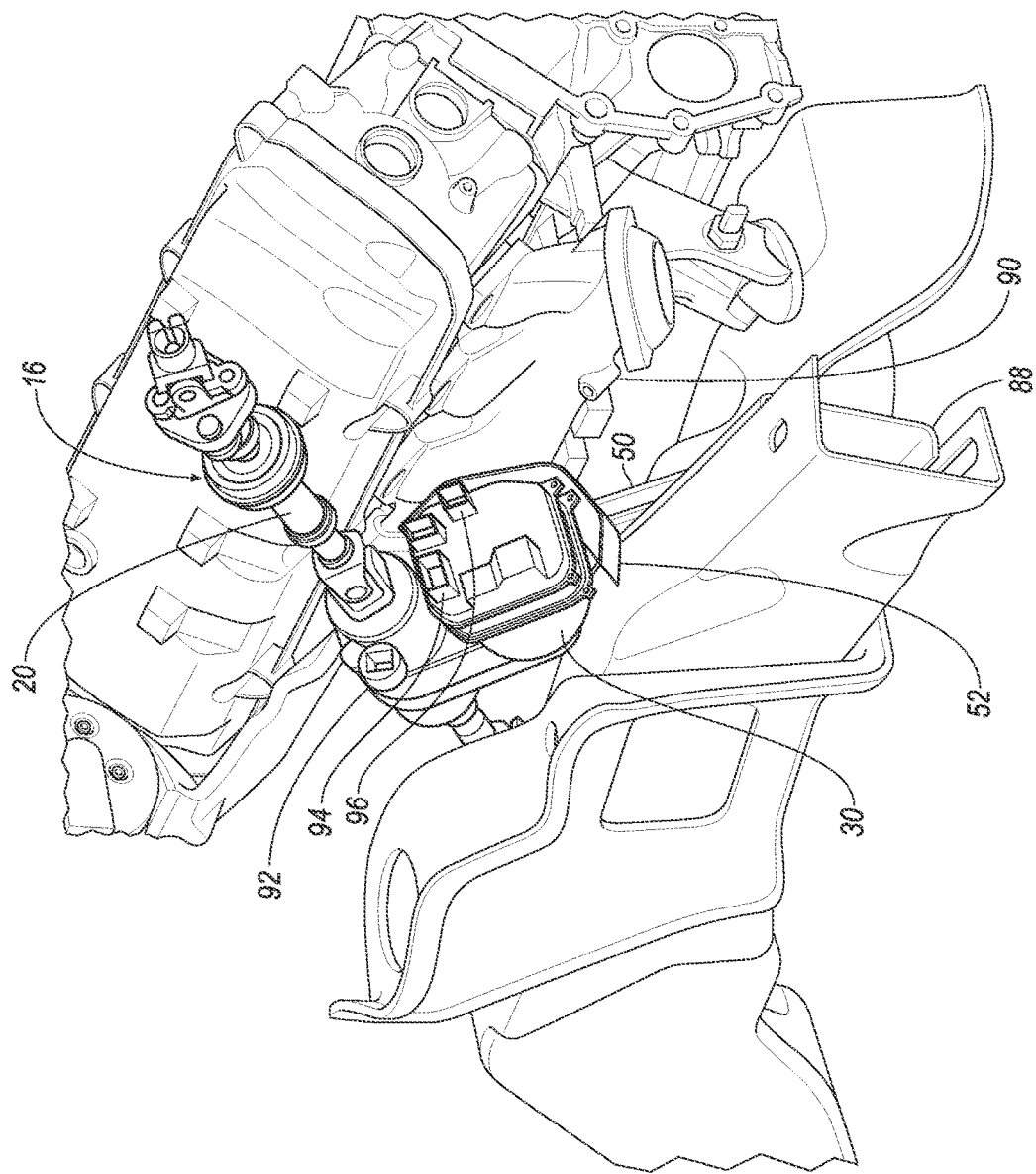
FIG. 5 is a perspective view of the steering actuator of FIG. 1 in an installed condition.

FIG. 5 illustrates an exemplary installation of a steering system 10 incorporating an electric steering assistance actuator 30 in a vehicle having an engine 90 mounted in a fore-aft orientation. Actuator 30 is retained in a desired location by an exemplary steel bracket 50. Bracket 50 has an exemplary stiffening bead, and is bolted on a first end to an inside wall of a vehicle frame rail 88. Bracket 50 is bolted on a second end to housing 40, supporting all of actuator 30. Housing 40 is spaced from vehicle engine 90 by bracket, with heat shield 52 protecting motor 32, torque sensor 34 and drive mechanism 36 from engine heat.

Electrical connections are provided to sensor 34 by a multipin electrical connector 92. Motor 32 is illustrated as having two electrical connectors 94 and 96 to control motor 32. The pins provide a means of communicating electrical power and electrical signals between electrical steering assistance actuator 30 and motor 32 and a power source such as a battery and the ECU.

Exemplary communications electrical lines (not shown) electrically connect the ECU and electrical steering assistance actuator 30, enabling communication therebetween. The electrical communication lines comprise part of a vehicle controller area network ("CAN") bus. Alternatively, wireless communication can provide a connection between the ECU and the electrical steering assistance actuator 30.

Steering system 10 is electrically connected to, and/or may be understood as including, the ECU, which may be alternatively characterized as a controller or a computer. The ECU is electrically connected to electric steering assistance actuator 30, and to sensors (not shown) which can include, by way of example, indications of torque based on a deflection of torsion shaft 76 indicative of driver-applier steering wheel torque, and signals of steering gear orientation. As noted above, such electronic connections may be made either with wire, or without wire using wireless communications technology.

The ECU includes at least one electronic processor and associated memory. The processor's operating system software is stored in memory for access by the processor. Also, control software for executing certain predetermined tasks is maintained in memory. The memory also includes a buffer region, or more simply a buffer, facilitating the storage and manipulation of data. The precise structure of the ECU is not critical to the present description and is within the knowledge of those skilled in the art. The ECU is programmed by control software to cause electric steering assistance actuator 30 to supply additional torque to steering column assembly 16 and to set a steering system position responsive to predetermined conditions.

Steering assistance actuator 30 operates in two modes—a steering assist mode, and an autonomous/semi-autonomous mode. In an exemplary embodiment of the steering assist mode, steering assistance actuator 30 applies a supplemental steering torque to steering column assembly 16 to reduce a driver steering effort. The supplemental torque is in addition to an assist provided by hydraulic steering gear 14. A magnitude of the supplemental steering torque varies as a function of a driver-applied steering wheel torque as measured by torque sensor 34. The supplemental torque reduces a force that a driver needs to apply to steering wheel 12 to achieve a desired repositioning of the steering linkage, and to maintain a particular steering linkage position. In an exemplary embodiment of the autonomous/semi-autonomous mode (the "second mode"), steering system 10 performs functions such as self-parking and lane-tracking not requiring driver input, and without signals from sensor 34. Based on data available from an array of vehicle sensors and stored information and transmitted information, such as GPS information, stored map information, optical recognition systems, accelerometers, and other sensors and information, operation of the steering system 10 in the second mode is made possible. The exemplary actuator 30 beneficially incorporates certain commercially available parts, including the motor 32, the ECU, and the torque sensor 34 to provide an electric steering assistance actuator that can be added to an existing hydraulic steering system without the expense or time associated with designing purpose-specific components. Compared to an integral actuator-steering gear assembly, the physical separation of exemplary actuator 30 from steering gear 14 allows for more independent and flexible packaging, facilitating the use of commercially available parts, and allows the use of a single actuator 30 across multiple vehicle platforms.

Certain functional benefits also accrue to steering system 10 with its use of actuator 30. Actuator 30 can apply torque overlay functionality to enhance base steering functionality, providing features such as speed sensitive steering, active return, assist curve shaping and damping as well as features such as pull drift compensation, lane assist, lane departure warning and many others. Actuator 30 can also provide an angle overlay control, thereby allowing autonomous steering functionality for features such as active park assist and trailer backup assist. Actuator 30 can also cancel phasing and wheel imbalances imparted by an offset mass to enable consistent driver steering torque and feel. Actuator 30 and its ECU software incorporate and utilize a motor angle sensing capability to produce a relative angle signal. The relative angle signal, in combination with a centerfind algorithm, as described in U.S. Pat. No. 7,401,870 which is hereby incorporated by reference, is used to identify an absolute steering position.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A steering system for a vehicle comprising:
a steering wheel;
an upper steering column shaft fixed to the steering wheel;
a steering assistance actuator including
an actuator shaft rotatable about a first axis and rotatably fixed on a first end to the upper steering column shaft,
the actuator shaft including an integral torque sensor,
a motor having an output shaft rotatable about a second axis with the second axis being substantially parallel to the first axis,
a drive mechanism disposed between and drivingly connecting the motor and the actuator shaft with the drive mechanism providing a speed reduction from the motor to the actuator shaft, and
a drive housing enclosing the torque sensor and the drive mechanism and having a mounting feature to which a housing of the motor is fixed and having a first bearing and a second bearing rotatably supporting the actuator shaft in the drive housing and the drive housing being separate from a hydraulically assisted steering gear and the drive housing being mounted in an engine bay to a component exclusive of a firewall wherein the drive housing is mounted to a bracket fixed to a frame rail; and
the hydraulically assisted steering gear drivingly connected to the actuator shaft.

2. The steering system of claim 1 wherein the drive housing is formed of a plurality of castings with two of the castings having a clamshell relationship and enclosing the drive mechanism and the torque sensor.

3. The steering system of claim 2 wherein the drive mechanism includes a drive pulley fixed to the output shaft of the motor and a driven pulley fixed to the actuator shaft and a belt disposed between and drivingly connecting the driven pulley and the drive pulley.

4. The steering system of claim 1 further comprising a heat shield fixed to the housing and disposed on a first side of the housing and extending across the first side of the housing and across a first side of the motor.

* * * * *